United States Patent
Hollenbach

(10) Patent No.: US 9,909,560 B1
(45) Date of Patent: Mar. 6, 2018

(54) TURBINE APPARATUS WITH AIRFOIL-SHAPED ENCLOSURE

(71) Applicant: Daniel F. Hollenbach, Oak Ridge, TN (US)

(72) Inventor: Daniel F. Hollenbach, Oak Ridge, TN (US)

( * ) Notice: Subject to any disclaimer, the term of this patent is extended or adjusted under 35 U.S.C. 154(b) by 0 days.

(21) Appl. No.: 15/630,135

(22) Filed: Jun. 22, 2017

(51) Int. Cl.
| | |
|---|---|
| *F03D 1/02* | (2006.01) |
| *F03D 1/04* | (2006.01) |
| *F03D 9/25* | (2016.01) |
| *F03B 17/06* | (2006.01) |

(52) U.S. Cl.
CPC .............. *F03D 1/04* (2013.01); *F03B 17/061* (2013.01); *F03D 1/02* (2013.01); *F03D 9/25* (2016.05); *F05B 2210/16* (2013.01); *F05B 2220/706* (2013.01); *F05B 2240/12* (2013.01)

(58) Field of Classification Search
CPC ..... F03D 1/02; F03D 1/04; F03D 9/00; F03D 9/25; F03D 9/30; F03D 9/35; F03D 9/37; F03D 17/061; F03D 3/0445; F05B 2240/12; F05B 2240/121
See application file for complete search history.

(56) References Cited

U.S. PATENT DOCUMENTS

| | | | |
|---|---|---|---|
| 3,035,538 A | 5/1962 | Willard | |
| 4,070,984 A | 1/1978 | Kappas | |
| 4,084,918 A * | 4/1978 | Pavlecka | ............... F03D 1/04 290/55 |
| 4,088,419 A | 5/1978 | Hope et al. | |
| 4,156,580 A | 5/1979 | Pohl | |
| 4,163,904 A | 8/1979 | Skendrovic | |
| 4,274,009 A | 6/1981 | Parker, Sr. | |
| 4,516,907 A * | 5/1985 | Edwards | ................... F03D 1/04 415/4.5 |
| 4,680,017 A | 7/1987 | Eller | |
| 4,764,683 A | 8/1988 | Coombes | |
| 4,832,634 A | 5/1989 | Kearns | |
| 5,130,032 A | 7/1992 | Sartori | |
| 5,915,324 A | 6/1999 | Gongwer | |
| 5,928,042 A | 7/1999 | Quiggins | |

(Continued)

FOREIGN PATENT DOCUMENTS

| | | | | |
|---|---|---|---|---|
| CA | 2487663 A1 * | 5/2005 | .............. | F03D 7/02 |
| WO | 2009020392 A2 | 2/2009 | | |
| WO | WO 2016130984 A2 * | 8/2016 | .............. | F03B 11/02 |

OTHER PUBLICATIONS

Lichtman, Flora, A Generator That Harnesses Energy From Ocean Currents, Popular Science, May 30, 2013, http://www.popsci.com/science/article/201305/aquaturbine, Accessed Jan. 4, 2017.

*Primary Examiner* — Igor Kershteyn
*Assistant Examiner* — Brian P Wolcott
(74) *Attorney, Agent, or Firm* — Luedeka Neely Group, P.C.

(57) ABSTRACT

An energy conversion system having two or more enclosures supported in a vertically-stacked configuration by an enclosure support. The enclosures are airfoil-shaped and enclose multiple oppositely-rotating fluid turbines. Fluid directing structures formed in the enclosure direct fluid into and out of the enclosure, including through the turbines. The fluid directing structures are parallel slats formed into the enclosure.

20 Claims, 9 Drawing Sheets

(56) References Cited

U.S. PATENT DOCUMENTS

| | | | |
|---|---|---|---|
| 6,472,768 B1 * | 10/2002 | Salls | F03B 17/061 |
| | | | 290/54 |
| 6,478,640 B1 | 11/2002 | Raps | |
| 6,508,191 B1 | 1/2003 | Spoljaric | |
| 6,575,109 B1 | 6/2003 | Gongwer | |
| 6,674,181 B2 | 1/2004 | Harbison | |
| 7,713,020 B2 | 5/2010 | Davidson et al. | |
| 8,664,784 B2 | 3/2014 | Janca et al. | |
| 8,668,433 B2 * | 3/2014 | Friesth | F03D 1/025 |
| | | | 290/55 |
| 8,827,631 B2 | 9/2014 | Achard et al. | |
| 8,834,093 B2 * | 9/2014 | Cucci | F03D 3/02 |
| | | | 415/4.1 |
| 9,115,685 B2 | 8/2015 | Ross | |
| 2003/0114052 A1 | 6/2003 | Schultz et al. | |
| 2007/0241566 A1 | 10/2007 | Kuehnle | |
| 2007/0284885 A1 | 12/2007 | Menges | |
| 2009/0061703 A1 | 5/2009 | Song et al. | |
| 2010/0032954 A1 | 2/2010 | Law | |
| 2010/0135768 A1 | 6/2010 | Pitre | |
| 2010/0213720 A1 | 8/2010 | Bailey et al. | |
| 2013/0294918 A1 | 11/2013 | Jaquier et al. | |
| 2016/0032888 A1 | 2/2016 | McCormack | |

\* cited by examiner

TURBINE APPARATUS WITH AIRFOIL-SHAPED ENCLOSURE

FIELD

This disclosure relates energy-converting turbine systems. More particularly, the present disclosure relates to a turbine-driven electric power generating system having an airfoil-shaped protective enclosure that improves efficiency of the energy conversion process.

BACKGROUND

Wind turbines have been used for several hundred years for pumping water, grinding grain, and providing the motive power for other mechanical devices. More recently, wind has been adopted as a means of generating electricity. In general, wind turbines consist of a tall rigid tower with a set of spinning blades facing into the wind. Most wind turbines have blades in excess of 100 ft. long with multiple blades per turbine. Some of the limitations of these wind turbines are caused by turbine blade instability at the ends of the blades due to high speeds, maintaining balance to prevent wobble, and induced vibration. Since the blades are not enclosed, their speed cannot be controlled except by varying the pitch of the blades. For these reasons, wind turbines may become damaged and unusable in high winds. Also, the turbine blades moving through the air are responsible for the death of millions of birds and bats each year, many of which are endangered species.

Accordingly, what is needed is an energy conversion system for converting the kinetic energy of a moving or flowing fluid into potential and useful energy and that is highly efficient and that protects against being damaged itself and against damaging other things.

SUMMARY

The above and other needs are met by a protective enclosing structure having fluid directing structures. The enclosing structure includes an airfoil-shaped enclosure body having a leading end and a trailing end. The enclosing body is configured to enclose at least two fluid turbines within an enclosed area formed inside the enclosure body. The enclosed area is defined by top and bottom enclosure surfaces, a leading enclosure surface located at the leading end and a trailing enclosure surface located at the trailing end and that is connected to the leading enclosure surface. A plurality of first fluid directing structures is formed in the leading enclosure surface for directing fluid through the leading enclosure surface and into the enclosed area. Likewise, a plurality of second fluid directing structures is formed in the trailing surface for directing fluid flowing out of the enclosed area through the trailing end of the enclosure body. As a result, a fluid flow path is formed between the first fluid directing structures and the second fluid directing structures. A turbine mount is also located within the enclosed area for mounting at least two turbines inside the enclosed area. The turbine mount is arranged to position turbines mounted to the turbine mount in the fluid flow path.

In certain embodiments, the enclosure body is a symmetrical airfoil shape formed by a left exterior surface that mirrors a right exterior surface about a chord line formed between the leading end and trailing end of the enclosure body. In some cases, the trailing enclosure surface is parabolic in shape.

An internal flow directing structure may be located in the enclosed area for redirecting fluid flowing through the leading enclosure surface and into the enclosed area. The internal flow directing structure may include a cowling having a flow-splitting nose for dividing a fluid flowing along the fluid flow path into at least two diverging streams of fluid, where one stream of fluid is directed towards each of the turbine mounts. Sometimes the cowling includes two concave flow-directing surfaces joined together by the flow-spitting nose. An internal separator may be formed in the enclosed area between the leading end and the trailing end and that has at least one opening for receiving the turbines. The internal separator forms a first enclosed section between the internal separator and the leading end and a second enclosed section between the internal separator and the trailing end. Fluid passing from the first enclosed section to the second enclosed section must pass through one of the openings in the internal separator. Turbines may be mounted to the internal separator at the turbine mounts so that they are positioned in the flow path of the fluid. In certain cases, a solid transition surface is formed between the leading enclosure surface and the trailing enclosure surface wherein the turbine mount is positioned within the solid transition surface.

The first and second fluid directing structures may include parallel vertical slats having spaces formed between them and formed in the leading and trailing enclosure surfaces. The first plurality of slats may form a convex leading enclosure surface. The slats may be moveable between an open position for providing the spaces between the parallel slats and a closed position for eliminating the spaces. In other cases, a movable panel fully or partially covers at least one of the first plurality of parallel slats or the second plurality of slats and is configured for selective movement between an open position where the spaces are not blocked by the movable panel and a closed position for blocking the spaces.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
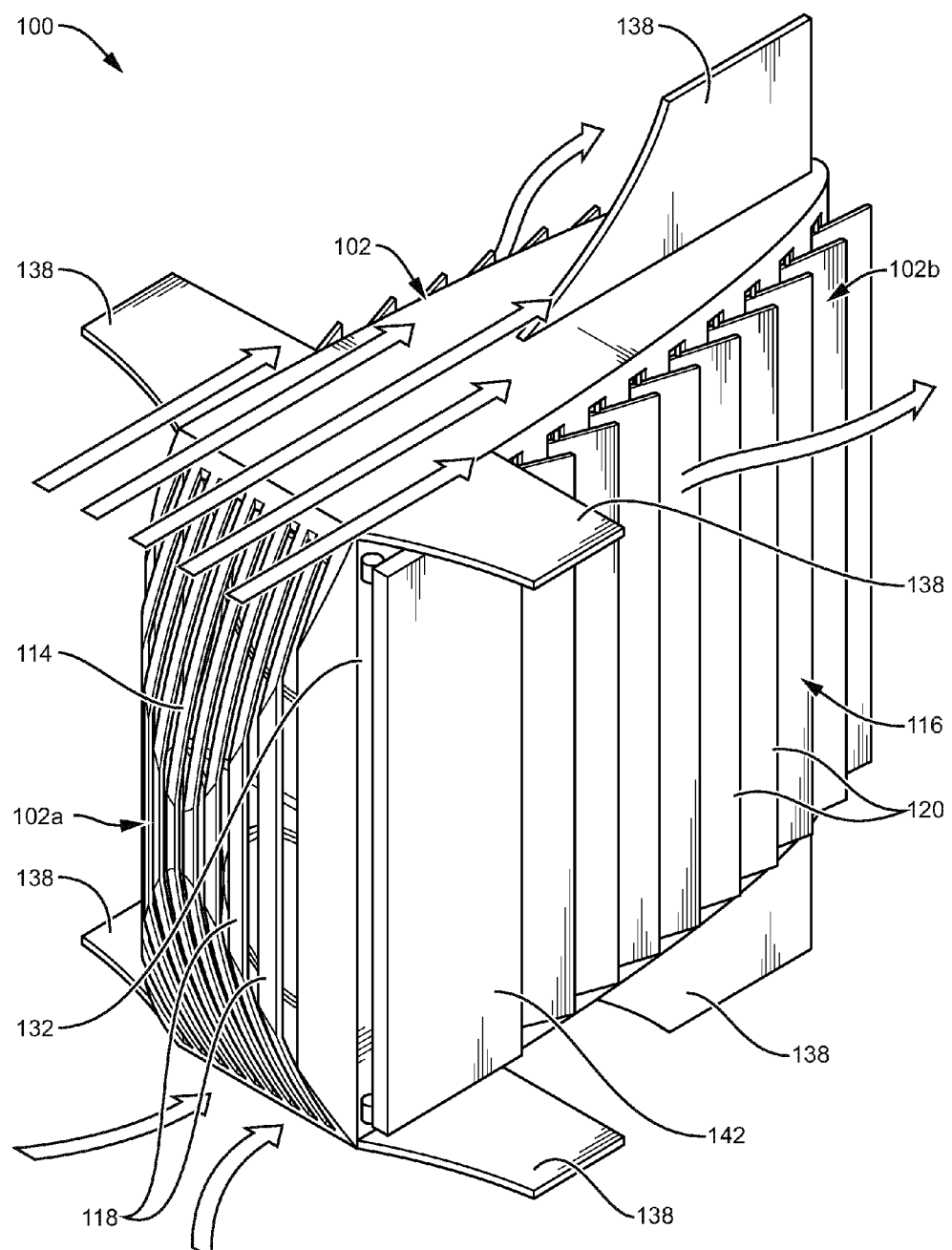
FIG. 1 is an overhead view of a protective enclosing structure having an airfoil-shaped enclosure and illustrating areas of high and low pressure.
Figure 2:
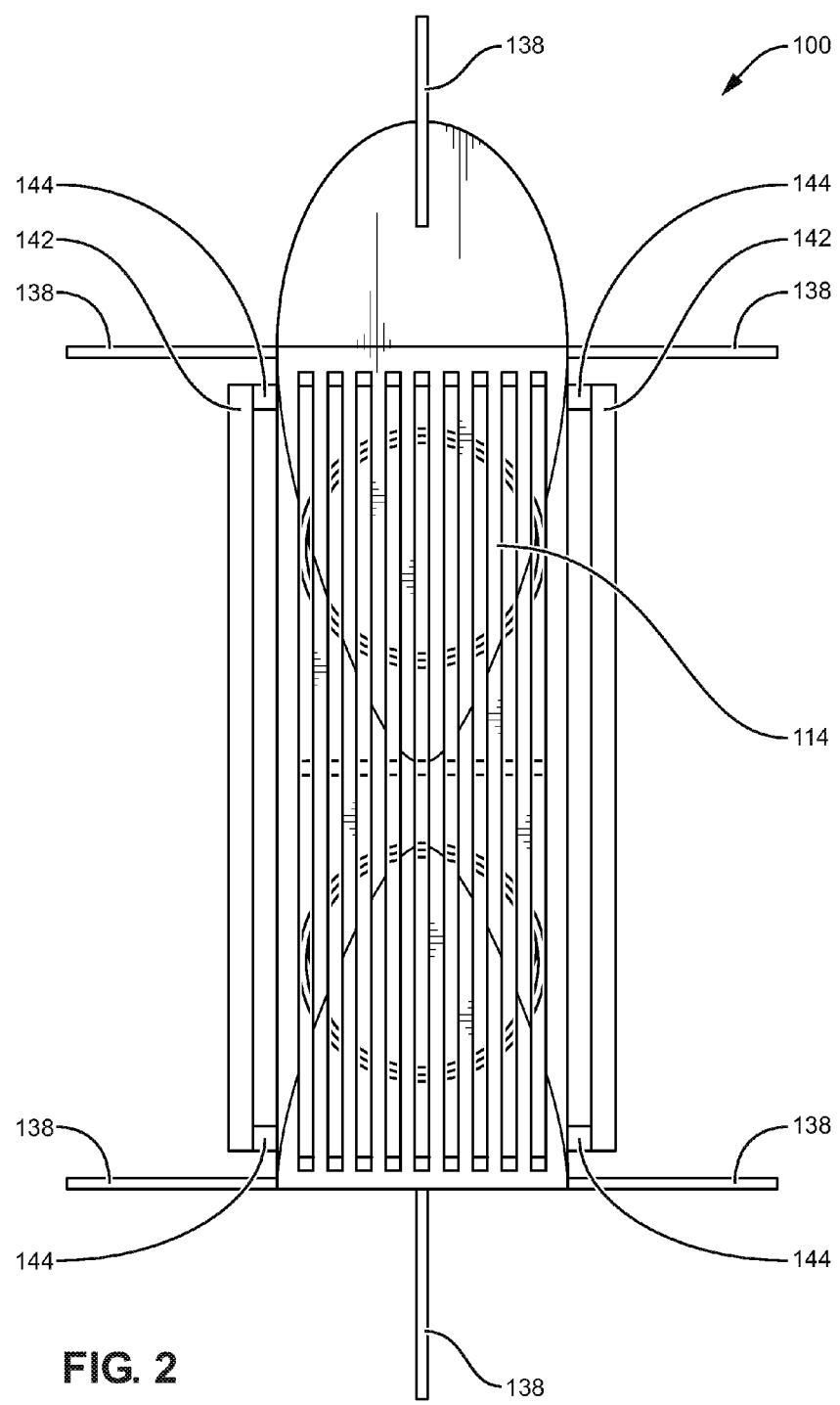
FIGS. 2 and 3 are a perspective views of the protective enclosing structure of FIG. 1.
Figure 3:
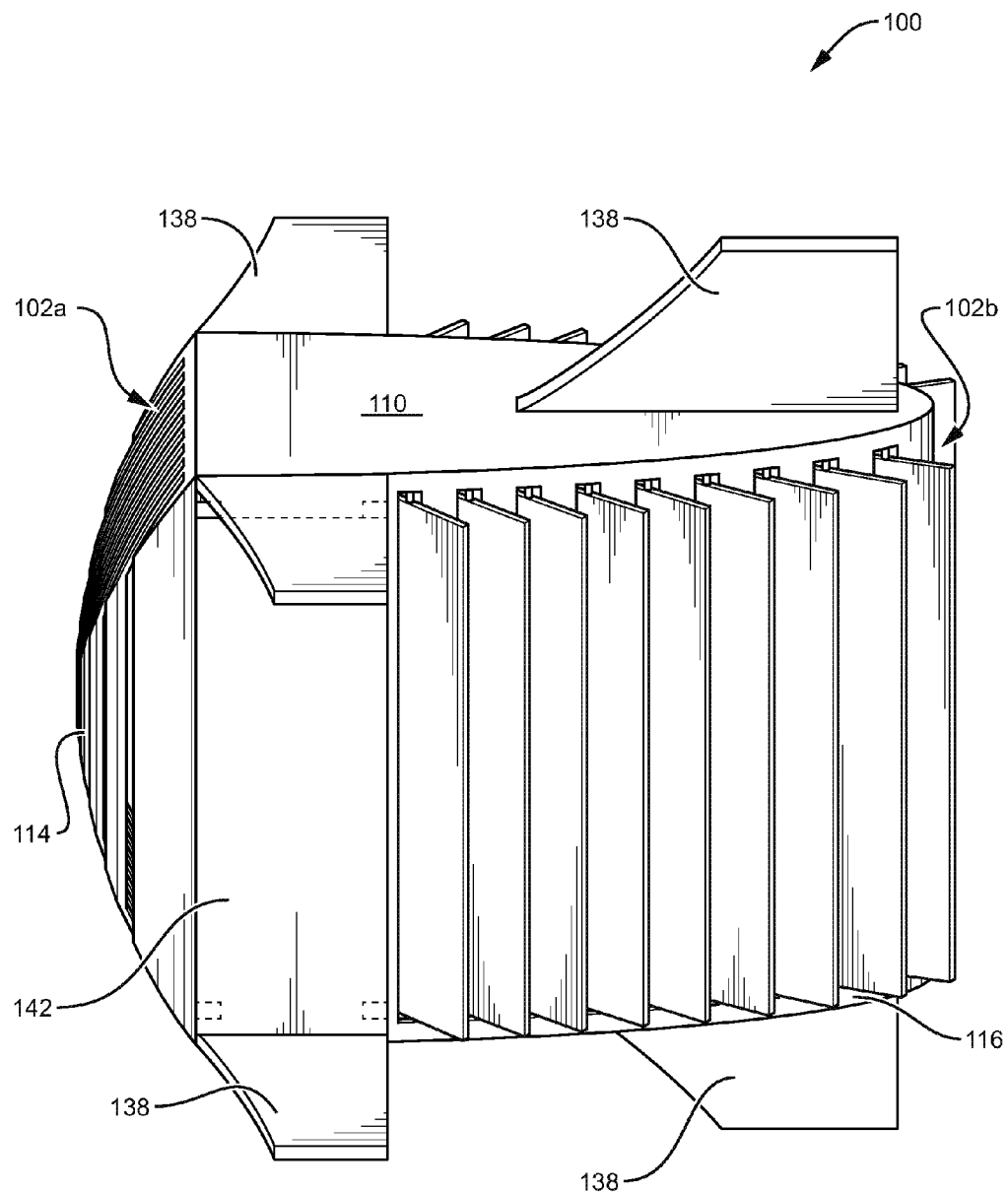

The present disclosure relates to a method of converting kinetic energy associated with a flowing fluid into potential energy, such as electric or electro-mechanical energy. The fluid can be compressible, such as air, or incompressible, such as water. With initial reference to FIGS. 1-5, an enclosure apparatus 100 is provided for enclosing multiple turbine-generators 108. As discussed further below, the enclosure 100 is shaped like a wing or airfoil, which modifies the fluid dynamics of the flowing fluid flowing through and around the enclosure to create areas of high and low pressure within and around the enclosure to improve the energy conversion efficiency of the turbines 108.

The enclosure structure 100 includes an enclosure body 102 having a leading end 102a and a trailing end 102b and an enclosed area defined by top enclosure surface 110, a bottom enclosure surface 112, a wide leading enclosure surface 114 located at the leading end 102a and a comparatively narrow trailing enclosure surface 116 located at the trailing end 102b. Since the leading end 102a of the enclosure body 102 is wider than its trailing end 102b, the enclosure body has a teardrop or airfoil (i.e., wing-like) shape. In some cases, the trailing enclosure surface 116 is parabolic in shape when viewed from a top-down or bottom-up perspective. Thus, the enclosure body 102 has a symmetrical airfoil shape where one side of the exterior surfaces mirrors the opposite exterior surfaces about a chord line 134 formed between the leading end 102a and trailing end 102b of the enclosure body 102.

The enclosure body 102 serves as a protective housing for at least two fluid turbines 108, which are enclosed inside of the enclosed area of the enclosure body. The turbines 108 are mounted within the enclosed area of the enclosure body 102 via a turbine mount 122. The turbines 108 rotate in opposite directions (i.e., counter-rotating) in order to reduce or eliminate rotational forces acting on the enclosing structure 100. The turbine mount 122 divides the enclosed area of the enclosure body 102 into two sections, including a first enclosed section 126a that is located between the turbine mount and the leading end 102a, and a second enclosed section 126b that is located between the turbine mount and the trailing end 102b.

The turbine mount 122 has mounting openings 127 formed in it and the turbines 108 are mounted in those mounting openings. Preferably, when mounted in the mounting openings 127, the turbines 108 are oriented such that their axes of rotation 140 are parallel (i.e., 0°) with respect to the chord line 134 of the enclosure body 102. However, in other cases, the axis of rotation 140 of the turbines 108 may be perpendicular (i.e., 90°) with respect to the chord line 134 of the enclosure body. Still, in other cases, the axis of rotation 140 of the turbines 108 may be at some other angle (i.e., between 0° and 90°) with respect to the chord line 134.

The mounting openings 127 of the turbine mount 122 are positioned so that the turbines 108 are spaced apart from one another. The turbine mount may further include an internal flow directing structure or cowling 128 that directs a portion of the fluid flowing through the enclosure 102 to each of the turbines 108. The cowling 128 is located between the mounting openings 127 of the turbine mount 122. The cowling 128 includes a V-shaped flow-splitting nose 130 that divides the flowing fluid into diverging streams, and one stream is directed towards each of the turbines 108. The cowling 128 is formed by concave or convex flow-directing surfaces 136 extending outwards from each side of the flow-splitting nose 130 that guide fluid to the turbines 108. One beneficial aspect of this design is that it tends to balance the fluid flow through each of the turbines 108 and reduce torque on the system. A generator 148 may also be mounted to the turbine mount 122. A shaft 150 of the generator is connected to shafts 152 of the turbines using a connection means. The connection means 154 may include, for example, a gear connection or a belt connection.

The leading enclosure surface 114 includes a plurality of first fluid directing structures 118, which straighten and direct fluid through the leading enclosure surface 102a, into the enclosed area, and through the turbines 108. The first fluid directing structures 118 also direct debris around the leading enclosure surface 102a so that it does not pass through the enclosure 102 or either turbine 108 mounted therein. Likewise, the trailing enclosure surface 116 includes a plurality of second fluid directing structures 120 for straightening and directing fluid flowing out of the enclosed area through the trailing end 102b of the enclosure body 102. The fluid directing structures 118, 120 straighten the fluid flow, which increases the overall efficiency of the system.

An internal fluid flow path is formed between the first fluid directing structures 118 and the second fluid directing structures 120. When traveling along this flow path, fluid flows into the enclosed area of the enclosure body 102 through the leading enclosure surface 114 via the first fluid directing structures 118, through the enclosed area and the turbines 108, and then out of the enclosed area through the trailing enclosure surface 116 via the second fluid directing structures 120.

The fluid directing structures 118, 120 are parallel slats mounted between the top enclosure surface 110 and the bottom enclosure surface 112. In other cases, the fluid directing structures 118, 120 may include bars or mesh. The slats are spaced apart such that spaces are formed between them and such that fluid flows into and out of the enclosure body 102 easily via those spaces. The enclosure body 102, as a whole, and the slats 118, 120, in particular, serve a protective function. They are designed to protect the turbines 108 from being damaged by debris and to protect against animals coming into contact with the turbines. Therefore, the spacing between the slats 118, 120 is sized to prevent debris, animals, birds, fish, or other objects above a specified size from passing into the enclosure body 102.

The shape of the slats 118, 120 also provides rigidity and strength to the leading enclosure surface 114, which assists in protecting the enclosure against collapse, impact damage, etc. In particular, the first fluid directing structures 118 (i.e., the front slats) form a convex leading enclosure surface 114 (i.e., bowing outwards) when viewed from above, below or either side. When looking at the front enclosure surface 114 from the front, the slats 118 are bent to provide a parabolic shape (visible in FIGS. 1 and 2). The apexes of those are adjacent one another and are located near the center of the front enclosure surface 114 and just in front of the flow-splitting nose 130. The slats 118 are curved outwards from the enclosure body 102 in the direction opposite the fluid flow direction as the fluid flows through the enclosure. This provides rigidity and strength to the front surface of the enclosure body 102. Additionally, debris or animals that contact the leading enclosure surface 114 are less likely to become stuck and are more likely to be travel along the curved surface and continue past the enclosing structure 100.

Figure 6:
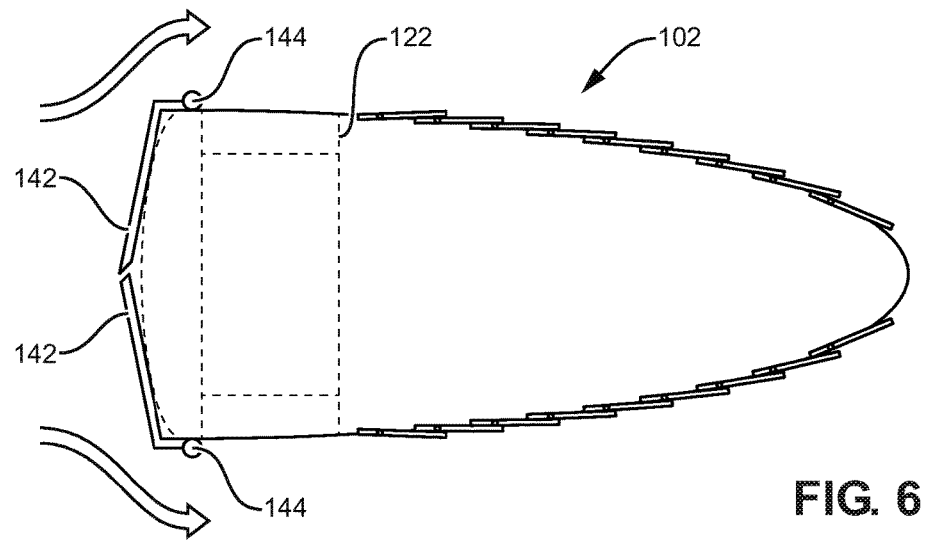
FIG. 6 is a cross-sectional view of the enclosing structure of FIG. 1 having a plurality of panels in a closed position.
Figure 7:
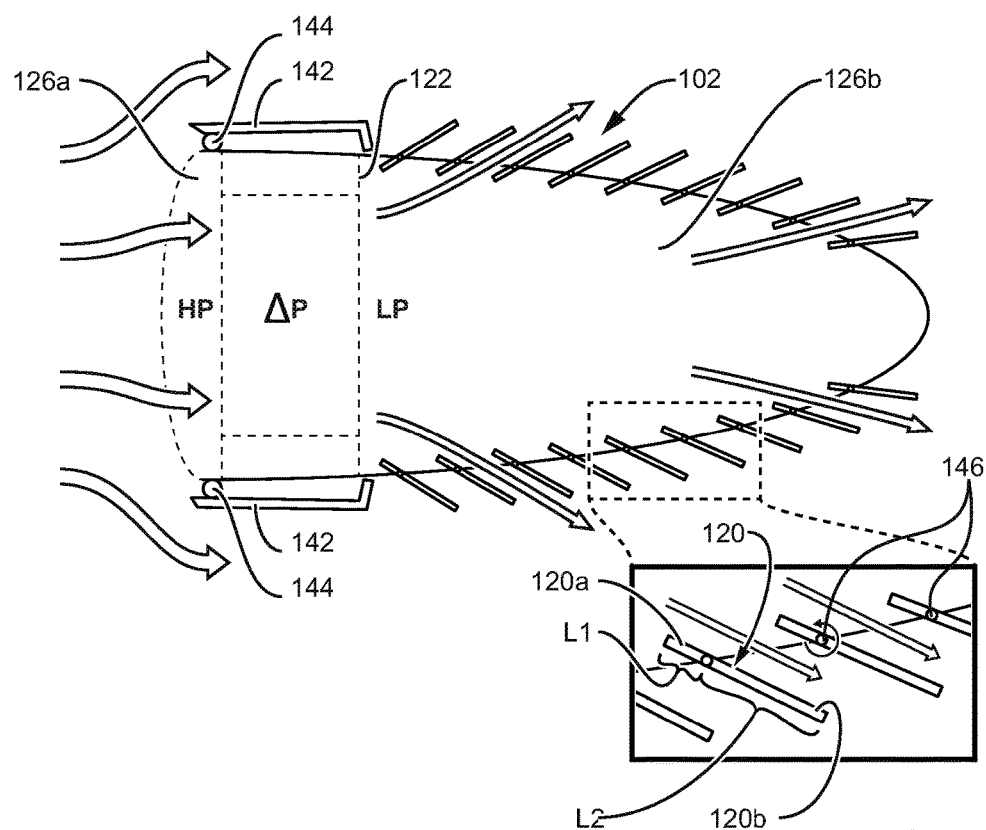
FIG. 7 is a cross-sectional view of the enclosing structure in FIG. 6, where the plurality of panels is in an open position.

The shape and spacing of the slats 118, 120 and the enclosure 100 body 102, generally, improves the performance of the enclosing structure 100 by modifying fluid flow dynamics as fluids pass through and around the enclosure body 102. In particular, as illustrated in FIGS. 6 and 7, a low-pressure region LP is inside of the enclosure in the second enclosed section 126*b*. A region of high pressure HP is located in the first enclosed section 126*a*. This enables a greater pressure drop ΔP to take place across the turbine-generator mounted to the turbine mount 122, which increases the energy conversion rate.

In certain embodiments, the slats 118, 120 have a fixed orientation in an open position. However, it may be desirable to partially or entirely close off either the leading or trailing ends of the enclosure body 102 in order to change the volume, velocity and pressure of the fluid passing through the enclosure. Additionally, the fluid flow through the enclosure 102 may be adjusted to minimize the rotational torque on the system 100. Another reason for varying the fluid velocity through the enclosure 102 is to protect the apparatus from damage in high velocity wind or water. Turbines rotating at too high of a velocity may be damaged due to excessive vibration or other factors that exceed design parameters. Another reason for changing the fluid velocity and pressure through the enclosure 102 is to maximize the efficiency of the energy conversion process. Generally, turbines operate efficiently over a set range of fluid velocities. In this case, the incoming and outgoing fluid velocity may be modified to fall within this range by adjusting the slats 118, 120. This allows the enclosing structure 100 to operate even during high winds, which would shut down conventional wind turbines.

To make these adjustments, the width or height of the spaces described above may be changed in order to vary the volume, velocity and pressure of the fluid passing through the enclosure. The enclosure body 102 includes a pair of removable solid panels 142 that are mounted along left and right edges of the leading end 102*a* with motorized hinges 144. The panels 142 are moved by the hinges 144 from a closed position (FIG. 6), where fluid flow into the enclosure body 102 is prevented, to an opening position (FIG. 7), where fluid flow into the enclosure body is permitted. Preferably, in the closed position, the panels 142 form a water (or air) tight seal with each other and with the leading end 102*a* so that fluid is prevented from entering the enclosure body 102. The panels 142 may also be moved to an intermediate position between fully closed and fully open.

Additionally, to vary the spacing between the slats 120 located at the trailing end 102*b* of the enclosure body 102, the slats may be rotated from a fully closed position (FIG. 6) to a fully open position (FIG. 7) or to a partially open position in between. When the slats 120 are fully closed, fluid tends not flow out of the trailing end 102*b* of the enclosure body 102. Rather, as shown in FIG. 6, fluid will tend to flow around the outside of the enclosure body 102. When the slats 120 are fully open, fluid flows out of the trailing end 102*b* of the enclosure body 102 freely. It may, therefore, be appreciated that fluid flow may be regulated (i.e., reduced) by selectively positioning the slats 120 at an intermediate position between fully closed and fully open. The top and bottom ends of each of the slats 120 is provided with a rotational axis 146 that rotatably positions the slat between the top enclosure surface 110 and the bottom enclosure surface 112. Turning means are provided for selectively turning the slats 120, individually or collectively, about their axes 146. The rotation means may include, for example, gears, actuators, springs, magnets, etc.

In the embodiment shown, the rotational axis 146 of each slat 120 is offset from the middle of the slat. For that reason, a first portion 120*a* on one side of the axis has a length L1 that is shorter than a length L2 of a second portion 120*b*. The slat 120 is oriented such that the larger second portion 120*b* is downstream from the smaller first portion 120*a*. The larger second portion 120*b* has a greater surface area than the smaller first portion 120*a*. For that reason, the force of fluid acting on the second portion 120*b* will be greater than the force of fluid acting on the first portion 120*a* and will tend to cause the slat 120 to move to the open position. As a result, the slats 120 may be automatically opened when fluid flows through the enclosure body 102. In that case, the turning means described above is used to force the slats 120 closed.

The efficiency of the enclosing structure 100 is improved by maximizing the amount of fluid that flows through the leading enclosure surface 114 and that subsequently flows through the turbines 108 and out through the trailing enclosure surface 116. Accordingly, as shown in FIG. 1, the enclosure body 102 includes a solid transition surface 132 formed between the leading enclosure surface 114 located at the leading end 102*a* and the trailing enclosure surface 116. Unlike the leading and trailing surfaces 114, 116, there are no openings of spaces in the solid transition surface 132. Thus, mounting the turbine mount 122 within the solid transition 132 isolates the first enclosed section 126*a* of the enclosure body 102 from the second enclosed section 126*b*. As a result, all or at least substantially all of the fluid flowing through the enclosure body 102 must flow through the mounting openings 127, including turbines 108 mounted in the mounting openings, in order to flow from the first enclosed section 126*a* to the second enclosed section 126*b*. Furthermore, the top enclosure surface 110 and bottom enclosure surface 112 and are also preferably solid. This ensures that fluid flossing through the second enclosed section 126*b* leaves the enclosure body 102 via the second fluid directing structures 120.

To further maximize the efficiency of the enclosing structure 100, the enclosure body 102 has additional design features enabling it to automatically turn the turbines 108 towards the oncoming fluid stream. In particular, the trailing enclosure surface 116 is elongated which causes the enclosure 102 to rotate in a similar fashion to a weathervane placed in a moving fluid stream. Fins 138 extending away from the enclosure body 102 further increases the enclosing structure's 100 tendency to rotate the turbines 108 and the leading enclosure surface 114 towards the oncoming fluid stream.

Figure 8:
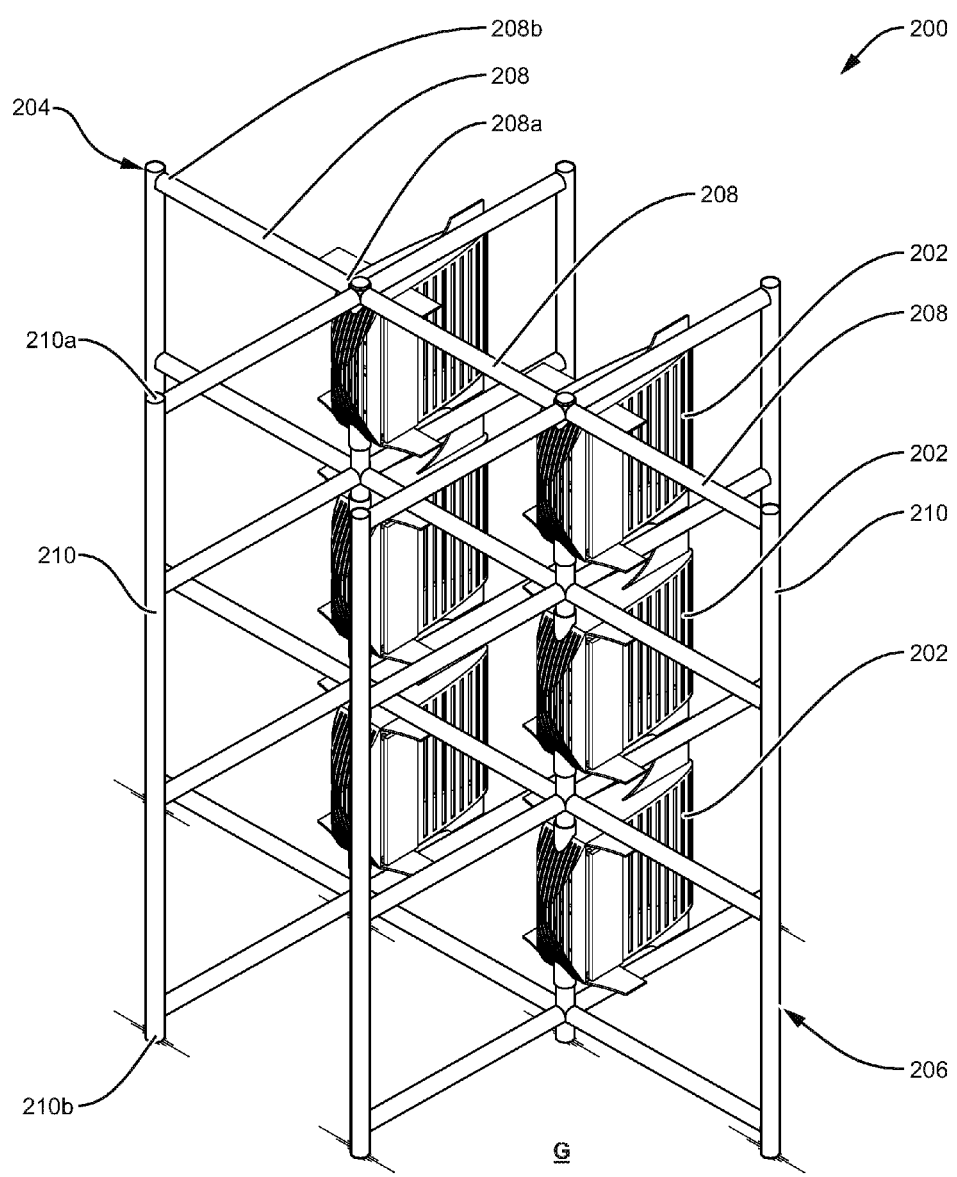
FIG. 8 is a perspective view illustrating a tower of vertically-stacked enclosures rotatably mounted to an enclosure support.

In FIG. 8, there is provided an energy conversion system 200 having two or more enclosures 202 that are structurally and functionally similar to the enclosing structure 100 discussed previously. The enclosures 202 are mounted to an enclosure support 204 in a vertically-stacked configuration. This particular energy conversion system 200 may be placed into a compressible fluid, such as air, to convert kinetic energy from the motion of that medium to potential energy. For example, the system 200 may be used to convert kinetic energy from wind currents to potential energy.

A stabilizing structure 206 is mounted to the enclosure support 204 for stabilizing the system 200. One function of the stabilizing structure 206, in particular, is reducing the effect of horizontal loads (e.g., wind or water loads). The stabilizing structure 206 includes three or more horizontal first stabilizers 208 positioned at various points around the enclosure support. A proximal end 208a of each first stabilizer 208 is mounted to the enclosure support 204 and a distal end 208b extends laterally outwards from the enclosure support and beyond the trailing end of the enclosure. The stabilizing structure further includes vertical second stabilizers 210 with top ends 210a mounted to the distal end 208b of the first stabilizers 208. Bottom ends 210b of the second stabilizers 210 engage a ground surface G to secure the stabilizing structure 206 to the ground G. In some cases, the stabilizing structure 206 has additional supports including multiple horizontal supports 208 mounted to a single vertical support 210. For example, in the apparatus shown, horizontal supports 208 are mounted both above and below the enclosures 202 and are joined at their distal ends 208b to a single vertical support 210. As shown in FIG. 8, multiple towers containing stacked enclosures may be interconnected. In other embodiments, a single tower may be provided.

The enclosures 202 are mounted to the enclosure support 204 such that the leading end of each of the enclosures rotates independently about the enclosure support 204 and the trailing end extends outwards away from the enclosure support. Each enclosure 202 rotates independently of the other enclosures. The enclosures 202 automatically rotate such that the leading end is directed into the flowing fluid. Since the distal end 208b is located laterally outwards beyond the trailing end of the enclosure 202, the enclosure can freely revolve entirely around the enclosure support 204 without colliding with the stabilizing structure 206.

Figure 4:
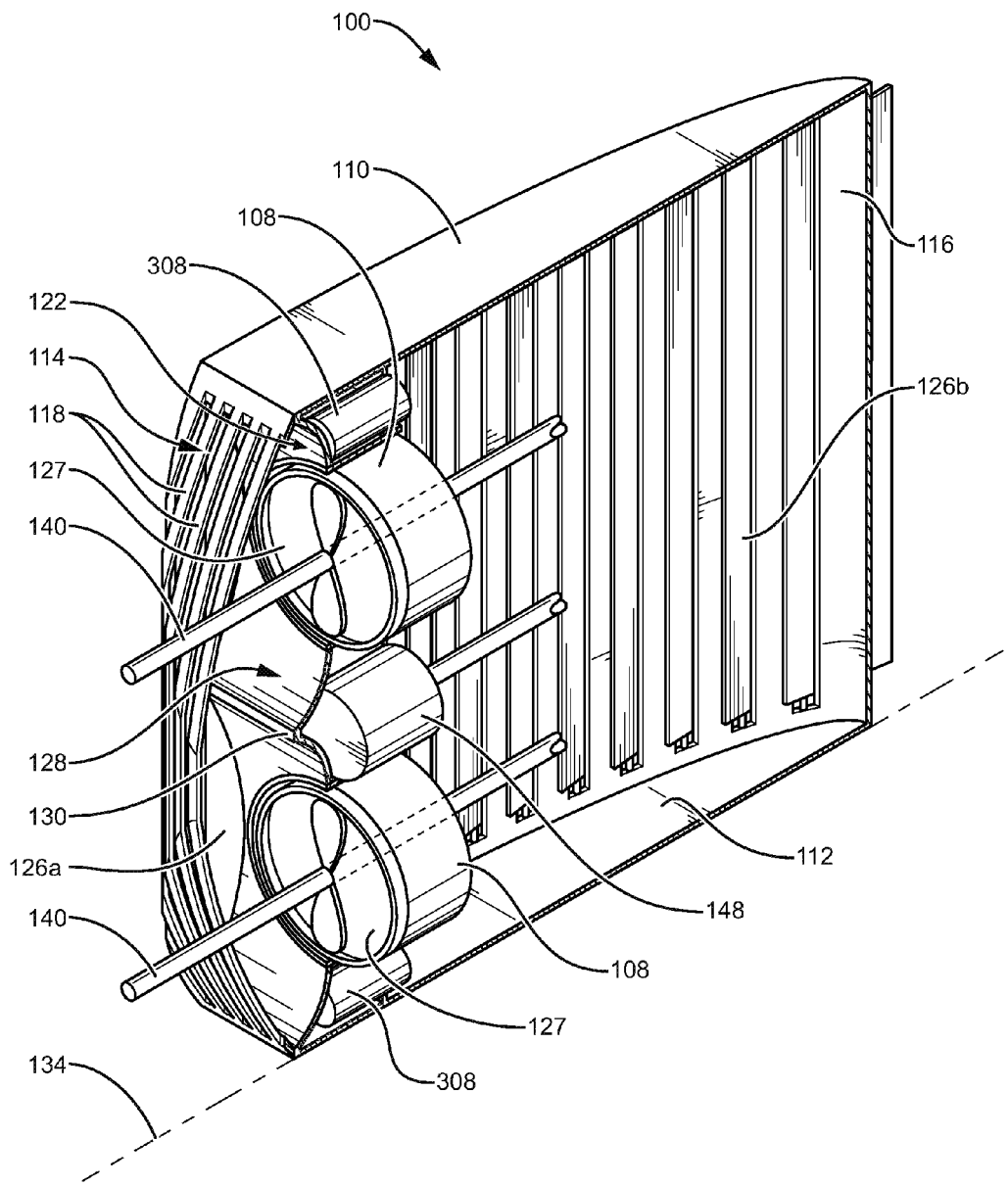
FIG. 4 is a cut-away front view of the protective enclosing structure of FIG. 1.
Figure 5:
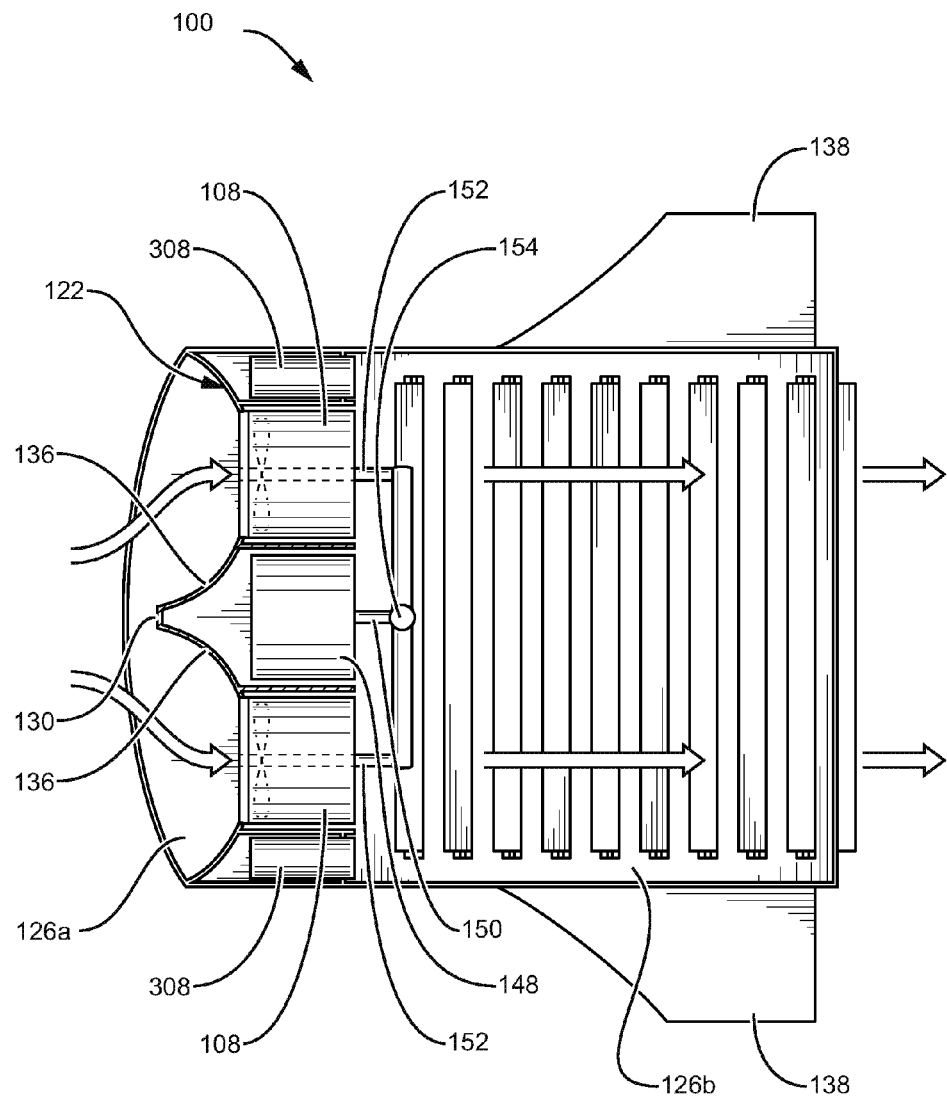
FIG. 5 is a cut-away side view of the protective enclosing structure of FIG. 1.
Figure 9:
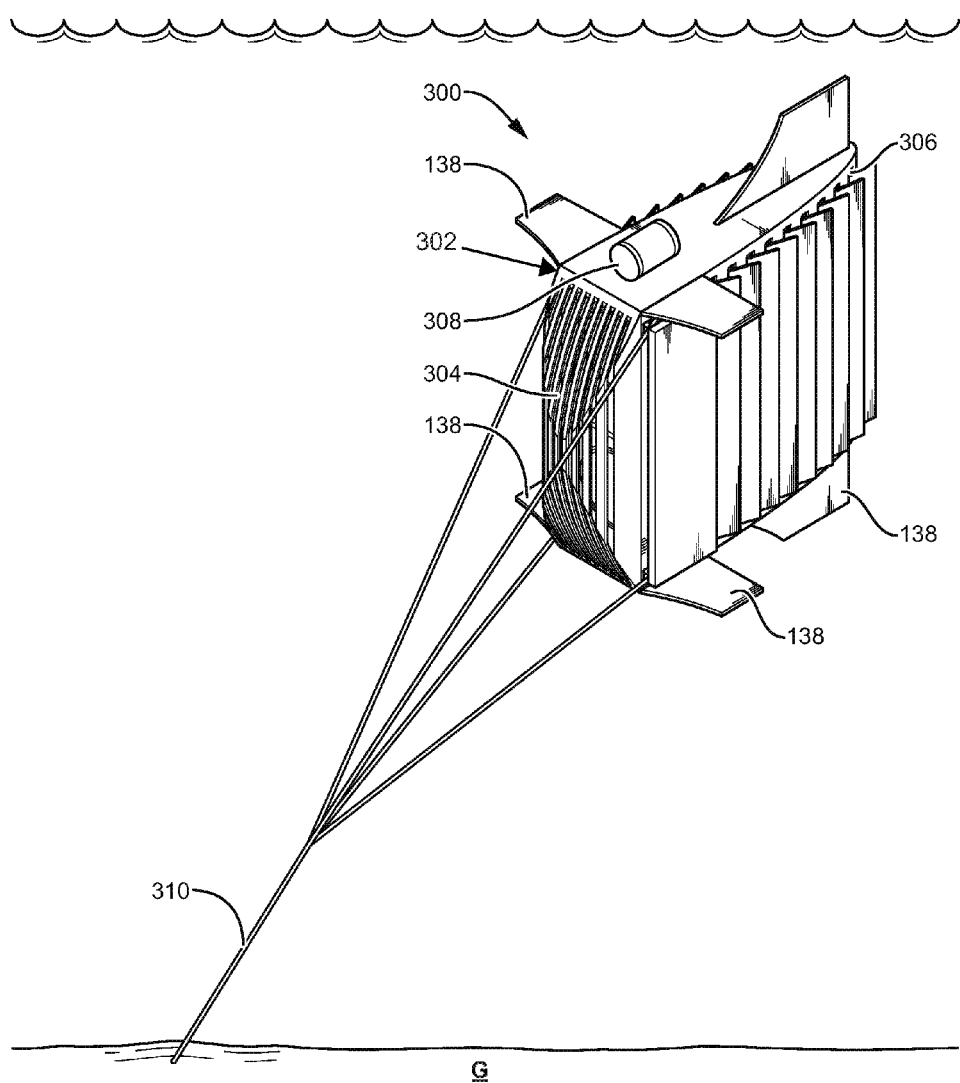
FIG. 9 is a perspective view illustrating a buoyant enclosure affixed to a ground surface in a fluid medium.

An alternative floating embodiment of a protective enclosing structure 300 having a leading end 304 and a trailing end 306 is depicted in FIG. 9, which may be used in a flowing liquid medium, such as an ocean or river. The enclosing structure 300 and its internal components are structurally and functionally similar to the enclosing structure 100 discussed previously. With reference to FIGS. 4 and 5, the floating version of the protective enclosing structure may optionally include one or more ballast tanks 308. The tanks may be filled with air or water for making the structure more or less buoyant. This may be useful, for example in submerging the device to the desired depth or to extract the device. The ballast tanks 308 may be mounted to the exterior surface of the structure or they may be mounted internally. In the embodiment shown, the tanks 308 are mounted within the solid transition surface 132 to the turbine mount 122. To conserve space, the tanks 308 are placed above and below the turbines.

Returning to FIG. 9, the enclosing structure 300 is designed to float and is, therefore, buoyant in the selected liquid. To ensure that the enclosure body 302 remains in an upright orientation, the enclosure and its internal components are designed such that, on average, the trailing end 306 is less dense than the leading end 304. For example, in some cases, different materials may be used for the enclosure body 302, itself, such that the trailing end 306 is lighter than the leading end 304. In other embodiments, ballast tanks 308 may be used to adjust the buoyancy of the structure. Additionally, as discussed above fins 138 may be attached to the exterior of the enclosure body 302 to assist in maintaining the correct orientation relative to the direction of the current and ground surface G. Lastly, the enclosure body 302 may be mounted to the ground surface G, such as an ocean bottom or riverbed via connectors 310, such as cables, chains, etc. When mounted to the ground surface G, the enclosure body 302 is free to rotate about the point of connection such that the leading end 304 faces into the fluid's flow.

Figure 10:
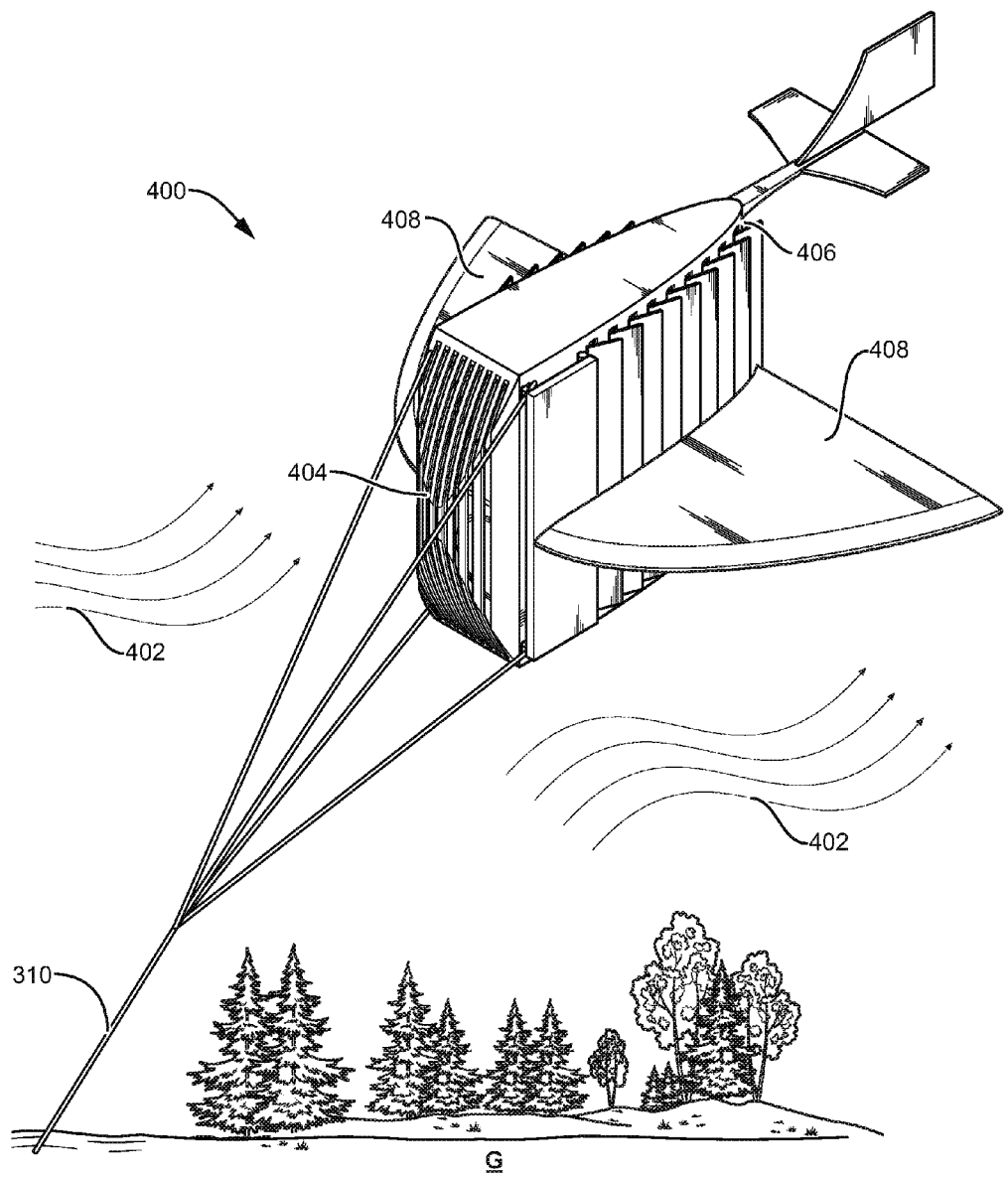
FIG. 10 is a perspective view illustrating an aerial version of an enclosure in the air and tethered to a ground surface.

Similarly, FIG. 10 depicts an alternative airborne embodiment of a protective enclosing structure 400 having a leading end 404 and a trailing end 406 that is configured to remain aloft in the presence of a sufficiently strong enough wind force 402 having a specified velocity depending on assembly size, drag and weight similar to that shown in FIG. 9. The enclosing structure 400 and its internal components are structurally and functionally similar to the enclosing structure 100 discussed previously. Externally, the structure 400 is provided with two or more wings 408 that are sized and configured to provide sufficient lift to keep the structure aloft under certain wind conditions. Lastly, the enclosure body 302 may be mounted to the ground surface G, such as an ocean bottom or riverbed via connectors 310, such as cables, chains, etc. When mounted to the ground surface G, the enclosure body 302 is free to rotate about the point of connection such that the leading end 404 faces into the fluid's flow.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A protective enclosing structure comprising:
   an enclosure body having a leading end, a trailing end, and an enclosed area defined by:
      a top enclosure surface;
      a bottom enclosure surface;
      a leading enclosure surface disposed between the top and bottom enclosure surfaces and enclosing the leading end of the enclosure body and configured to prevent foreign bodies from entering the enclosed area via the leading end; and
      a trailing enclosure surface disposed between the top and bottom enclosure surfaces and enclosing the trailing end of the enclosure body and configured to prevent foreign bodies from entering the enclosed area via the trailing end,
      wherein an outer profile of the leading enclosure surface and the trailing enclosure surface, in combination, is symmetrically airfoil-shaped and tapers in size from a wider leading end to a narrower trailing end;
   a plurality of first spaces formed in the leading enclosure surface for permitting fluid to pass through the leading enclosure surface and into the enclosed area;
   a plurality of second spaces formed in the trailing enclosure surface for permitting fluid to pass through the trailing end and out of the enclosed area; and
   a turbine mount disposed within the enclosed area for mounting at least two turbines inside the enclosed area,
   wherein, when the protective enclosing structure is placed into a moving fluid and is oriented such that the moving fluid flows into the protective enclosing structure through the first spaces and out of the protective enclosing structure through the second spaces, the airfoil-shaped outer profile of the protective enclosing structure results in higher pressure areas of fluid being generated in front of the leading enclosure surface and within the protective enclosing structure between the leading end and the turbine mount and lower pressure areas of fluid being generated within the protective enclosing structure between the fluid mount and the trailing end and along the exterior of the trailing enclosure surface.

2. The enclosing structure of claim 1 wherein the symmetrical airfoil shape of the outer profile is formed by a left exterior surface of the leading and trailing enclosure surfaces that mirrors a right exterior surface of the leading and trailing enclosure surfaces about a chord line formed between the leading end and trailing end of the enclosure body.

3. The enclosing structure of claim 1 wherein the plurality of first spaces located in the leading enclosure surface is formed between a first plurality of parallel slats, the plurality of second spaces located in the trailing enclosure surface is formed between a second plurality of parallel slats.

4. The enclosing structure of claim 3 wherein at least one of the first plurality of parallel slats or the second plurality of slats is moveable between an open position for permitting fluid to flow through the plurality of first spaces or the plurality of second spaces and a closed position for preventing fluid from flowing through the plurality of first spaces or the plurality of second spaces.

5. The enclosing structure of claim 3 further comprising a movable panel for covering the first plurality of parallel slats and configured for selective movement between an open position where the plurality of first spaces are not blocked by the movable panel and a closed position for blocking the spaces.

6. The enclosing structure of claim 1 wherein the leading enclosure surface is convex in shape such that it bows outwards away from the enclosed area, whereby the convex shape guides foreign bodies located in front of the enclosing body around the leading enclosure surface to continue flowing past the enclosing body.

7. The enclosing structure of claim 1 further comprising an internal flow directing structure disposed in the enclosed area for redirecting fluid flowing through the leading enclosure surface and into the enclosed area.

8. The enclosing structure of claim 7 wherein the internal flow directing structure comprises a cowling having a flow-splitting nose for dividing a fluid flowing along the fluid flow path into at least two diverging streams of fluid, where one stream of fluid is directed towards each of the at least two turbines.

9. The enclosing structure of claim 8 wherein the cowling comprises a convex or concave flow-directing surface for each flow path joined together by the flow-spitting nose.

10. The enclosing structure of claim 1 further comprising a solid transition surface formed between the leading enclosure surface and the trailing enclosure surface wherein the turbine mount is positioned within the solid transition surface.

11. The enclosing structure of claim 1 wherein the trailing enclosure surface is parabolic in shape.

12. The enclosing structure of claim 1 further comprising an internal separator formed in the enclosed area between the leading end and the trailing end and having at least one opening for receiving the turbines, the internal separator forming a first enclosed section between the internal separator and the leading end and a second enclosed section between the internal separator and the trailing end, wherein fluid passing from the first enclosed section to the second enclosed section must pass through one of the openings in the internal separator and wherein the turbine mount is mounted to the internal separator.

13. The enclosing structure of claim 12 further comprising an internal flow directing structure disposed in the first enclosed area for redirecting fluid flowing through the leading enclosure surface through the at least one opening and into the second enclosed area.

14. A turbine apparatus comprising:
an enclosure body having a leading end, a trailing end, and an enclosed area defined by:
a top enclosure surface;
a bottom enclosure surface;
a leading enclosure surface disposed between the top and bottom enclosure surfaces and enclosing the leading end of the enclosure body and configured to prevent foreign bodies from entering the enclosed area via the leading end; and
a trailing enclosure surface disposed between the top and bottom enclosure surface and enclosing the trailing end of the enclosure body and configured to prevent foreign bodies from entering the enclosed area via the trailing end,
wherein an outer profile of the leading enclosure surface and the trailing enclosure surface, in combination, is symmetrically airfoil-shaped and tapers in size from a wider leading end to a narrower trailing end;
a plurality of first spaces formed in the leading enclosure surface for permitting fluid to pass through the leading enclosure surface and into the enclosed area;
a plurality of second spaces formed in the trailing surface for permitting fluid to pass through the trailing end and out of the enclosed area;
a turbine mount disposed within the enclosed area for mounting at least two turbines inside the enclosed area;
two oppositely rotating turbines mounted to the turbine mount; and
a generator in communication with the turbines for converting kinetic energy of the rotating turbines into potential energy,
wherein, when the enclosure body is placed into a moving fluid and is oriented such that the moving fluid flows into the enclosure body through the first spaces and out of the enclosure body through the second spaces, the airfoil-shaped outer profile of the enclosure body results in higher pressure areas of fluid being generated in front of the leading enclosure surface and within the enclosure body between the leading end and the turbine mount and lower pressure areas of fluid being generated within the enclosure body between the fluid mount and the trailing end and along the exterior of the trailing enclosure surface.

15. The apparatus of claim 14 wherein each of the at least two turbines has an axis of rotation that is parallel with a chord line formed between the leading end and trailing end of the enclosure body.

16. The apparatus of claim 14 further comprising an enclosure support for supporting two or more enclosure bodies in a vertically-stacked configuration.

17. An energy conversion system comprising:
two or more enclosures, each enclosure having:
an enclosure body having a leading end, a trailing end, and an enclosed area defined by a top enclosure surface, a bottom enclosure surface, a leading enclosure surface disposed between the top and bottom enclosure surface and enclosing the leading end of the enclosure body and configured to prevent foreign bodies from entering the enclosed area via the leading end, and a trailing enclosure surface disposed between the top and bottom enclosure surfaces and enclosing the trailing end of the enclosure body and configured to prevent foreign bodies from entering the enclosed area via the trailing end;

a plurality of first spaces formed in the leading enclosure surface for permitting fluid to pass through the leading enclosure surface and into the enclosed area;

a plurality of second spaces formed in the trailing enclosure surface for permitting fluid to pass through the trailing end and out of the enclosed area;

a turbine mount disposed within the enclosed area for mounting at least two turbines inside the enclosed area; and two or more oppositely rotating turbines enclosed within the enclosed area of each of the two or more enclosures, the two or more oppositely rotating turbines being mounted to each of the two or more enclosures at the turbine mount and operable to rotate when the apparatus is placed into a moving stream of fluid and fluid moves through the enclosed area; and an enclosure support for supporting the two or more enclosures in a vertically-stacked configuration such that the leading end of each of the enclosures rotates independently about the enclosure support and the trailing end extends outwards away from the enclosure support, wherein, when the enclosure body is placed into a moving fluid and is oriented such that the moving fluid flows into the enclosure body through the first spaces and out of the enclosure body through the second spaces, the airfoil-shaped outer profile of the enclosure body results in higher pressure areas of fluid being generated in front of the leading enclosure surface and within the enclosure body between the leading end and the turbine mount and lower pressure areas of fluid being generated within the enclosure body between the fluid mount and the trailing end and along the exterior of the trailing enclosure surface.

18. The system of claim 17 further comprising a stabilizing structure having a first end mounted to the enclosure support and a second end mounted to a ground surface.

19. The system of claim 18 further having:

three or more first stabilizers disposed around the enclosure support and having a proximal end mounted to the enclosure support and a distal end extending laterally outwards from the enclosure support beyond the trailing end of the enclosure; and three or more second stabilizers, each second stabilizer having a top end mounted to one of the three or more first stabilizers and a bottom end mounted to a ground surface.

20. The system of claim 17 wherein the two or more enclosures are configured to rotate up to 360° about the enclosure support.

* * * * *